United States Patent Office 3,344,810
Patented Oct. 3, 1967

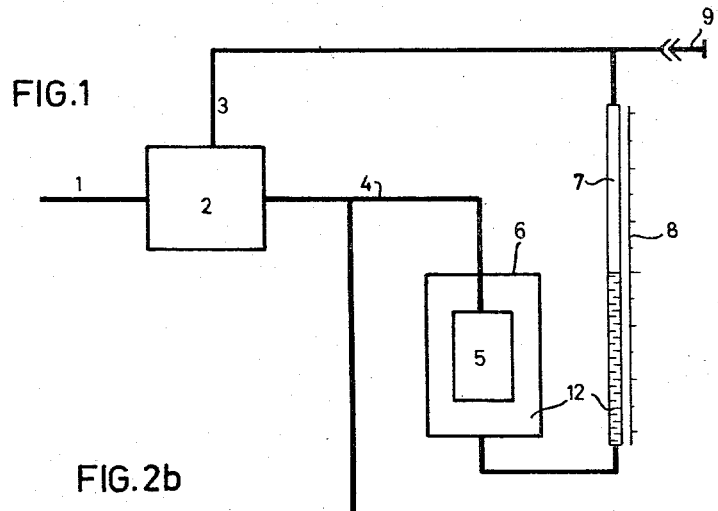
FIG.1
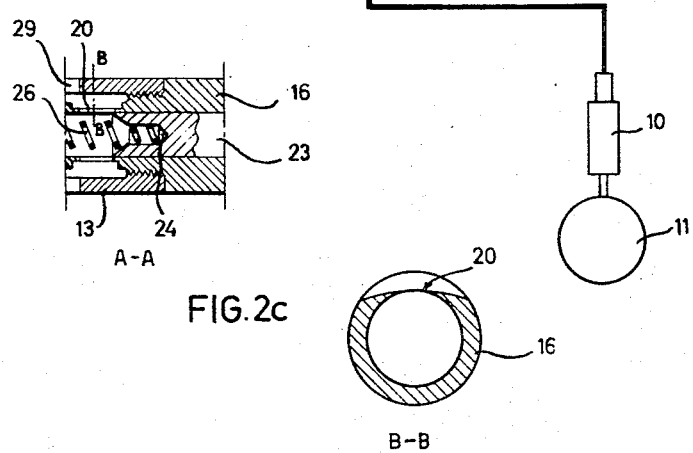
FIG.2b
FIG.2c
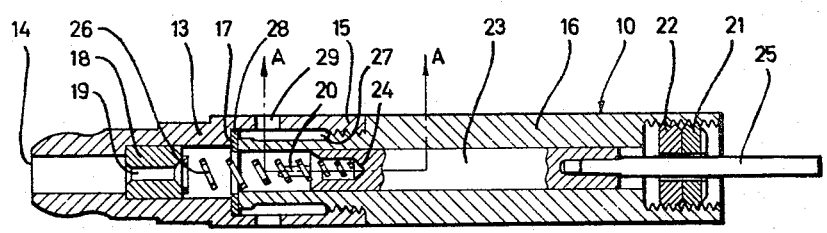
FIG.2

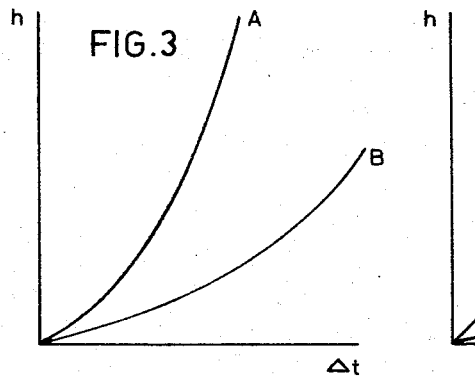
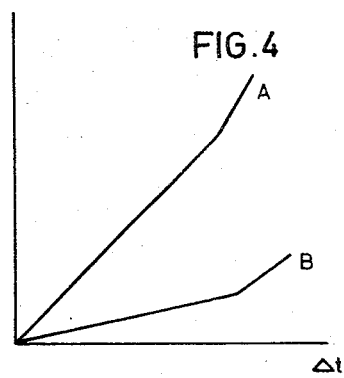
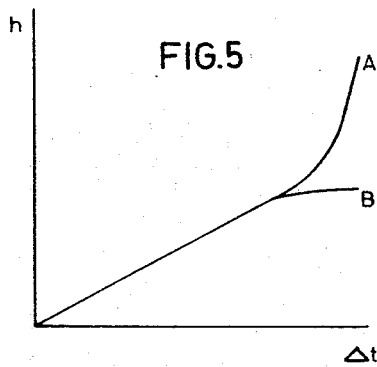
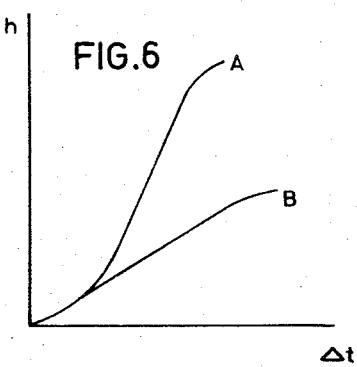
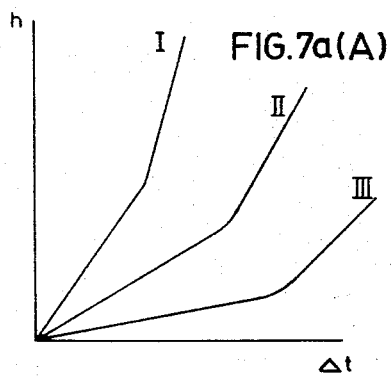
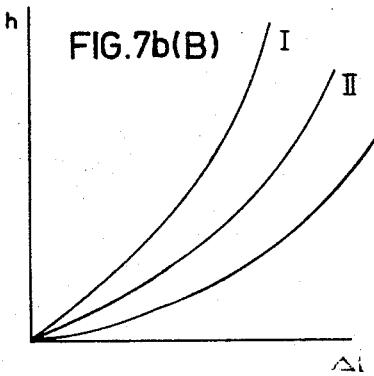

3,344,810
TRANSMITTING ELEMENT FOR GAUGING INSTRUMENTS
Adam Zausznica, Bandhagen, Sweden, assignor to Ingenjörsfirma A. Alfredéen AB, Bandhagen, Sweden
Filed June 3, 1963, Ser. No. 284,968
1 Claim. (Cl. 138—46)

This invention relates to pneumatic gauging instruments and particularly to a transmitting element for such instruments.

Due to the fact that pneumatic gauging instruments have been used in engineering for more than 30 years a great number of different types and makes are available. The known instruments are different in construction and operate after different principles. Irrespective of their variations in type and working principle, however, the said intsruments can be observed to follow a common basic functional principle and a common line of indicating the results of their measurements.

By this general functional principle common to all types of said instruments, it is possible to make comparisons between the various types.

In complete state, a pneumatic gauging instrument comprises three main elements, i.e. (a) transmitting element, (b) converting link, and (c) indicator.

The transmitting element has as its object to receive impulses of varying size (in the form of alterations in the dimensions of the object to be measured), and to transmit the impulses in one way or the other to the next functional element.

The converting link receives corresponding impulses from the transmitting element at its receiving end, converts them into signals adequate for the secondary, or more precisely, the emitting end and transfers the signals to the indicator.

The indicator has as its functional object to express the signals received from the converting link in a clear and comprehensible manner. (For example, visually on a dial, drawn on a diagram.)

In the production of a rational pneumatic gauging instrument, it is desired that linear displacements of he sensing member of the transmitting element (caused by alterations in the dimensions of the object to be measured) will result in linear displacements of the visualizer of the indicator element.

In connection with the above-mentioned functional objects of the functional elements, it appears also the aforesaid tendency which is characteristic of the majority of indicators in all gauging instruments, i.e., the tendency of expressing the result of the measurements by a linear scale. As already mentioned, it is the main object of a great number of pneumatic gauging instruments to get linear displacements of the sensing member during the measuring operation expressed by corresponding linear displacements of the indicator. The problem, however, is that in practice none of the known pneumatic gauging instruments can produce such proportionality between displacements of the sensing member (i.e. variations in the dimensions of the object measured) and the alterations visualized by the indicator. When studying the theoretical principles on which the operation of pneumatic gauging instruments is based, the factor which in all cases is found rendering empirical dealing with the problem possible is *approximation*. The functional principle of all known pneumatic gauging instruments deviates, in other words, from the theoretical principles and makes to a greater or smaller degree use of approximation which, one has to admit, constitutes within certain limits, determined by practice, the satisfactory operational basis for the functioning of the gauging instrument. For illustrating this fact, the functions of the functional elements comprised in pneumatic gauging instruments will be analysed in the following.

It can be observed immediately that the following mode of thinking is common to all constructional embodiments: a sequence of impulses and signals which both are alleged to be of linear nature, are transmitted through all of the said functional elements. The said propagation of impulses and signals as well as their alleged linear nature can be illustrated by the diagram as follows.

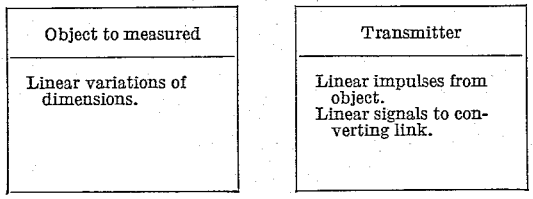

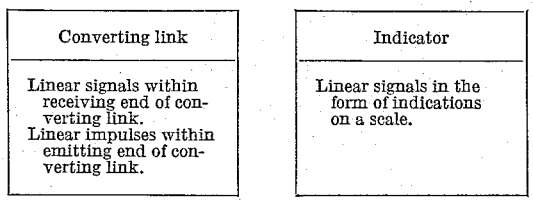

The approximation mentioned above is practiced in each of the elements shown in the diagram. It is already found in the transmitting element, due to the fact that this element irrespective of its type and construction is based on empirical facts and a fully conscious compromise against the theoretical rules and principles. What distinguishes the different types of transmitting elements is substantially only the size and degree of the said approximation.

The same situation (even to a larger extent and in a wider scope) is found when analysing the converting link. The converting element is usually a pressure vessel comprising a device of the Bourdon tube type, a bellows of different types, an expansion box, resilient vessel, a diaphragm of various types and materials (goffered or flat) and the like. It is obvious that a functional converting element operating with the help of one of the aforesaid devices, is by no means capable of producing a proportional relationship between the alterations of impulses received by the device and the signals emitted, i.e. between, for example, the changes in pressure at the receiving end of the converting element and the changes of the geometrical configuration of the converting device (which changes are emitted to the indicator).

What occurs in the converting link is, thus, an *approximation in the proportionality* between the size of the impulses and the corresponding signals.

As regards the situation in the indicating functional element, a linear relationship between the impulse side of the indicating element and the indications by the visualizer can be obtained by using a liquid column as visualizer. If the indicator is based on a different principle (spring mechanism, lever system etc.), proportionality cannot be obtained.

The known pneumatic gauging instruments are, consequently, not capable of producing a proportional relationship between the changes in the dimensions of the object measured, which changes are of a linear nature, and the visualizer of the gauging instrument, for example a linear scale, due to the approximation occurring in the said three links, or at least in two of them.

This invention relates to a transmitting element which does not include the drawback of approximation accumulating in all functional steps of the measuring process, and which compensates for the incorrectnesses of the aforedescribed type found in pneumatic gauging instruments in general.

The invention is based on principles which are entirely contrary to the principles applied heretofore, and is based only on such theoretical assumptions which are confirmed in practice.

Firstly, the invention is not based on the alleged principle of proportionality between linear alterations of the sensing member of the transmitting element and the variations of the air flow parameters, because, in a strict meaning, such proportionality does not exist.

Secondly, instead of neglecting the importance of the deviations within the converting functional element of the gauging instrument and instead of accepting approximative converting of the functions concerned, the invention attributes to the said deviations such an importance that the type and size of the deviations are included in the calculation.

Thirdly, the invention takes also into consideration the deviations from linearity which may possibly occur in the final functional element, i.e. the indicator.

Fourthly, the invention produces a strict proportional relationship between the changes in the dimensions of the object to be measured and the indications made by the indicator, due to a special construction of the transmitting element according to which the effects of all incorrectnesses and deviations are fully compensated for in subsequent functional elements of the gauging instrument.

Fifthly, the invention renders it possible, thanks to a specially adapted construction of its transmiting element to produce all other desired relationship between the linear alterations of the object measured and the indications made by the indicator, the said relationship being such that it can be advantageous from a production point of view. The gauging instrument assumed to be connected to an automatic tooling machine, it may be of particular interest, for example, to exaggerate the size of the signals (commencing at a certain point within the tolerance range) and thereby their correcting effect on servo-elements. Due to automation, there may be highly different requirements with respect to the process of the mathematical function characterizing the relation between the linear displacements of the transmitting element and the signal parameters emitted to subsequent functional elements of the gauging instrument and finally arriving at the visualizer of the indicator.

The characterizing features of the invention in relation to the present state of art may be summarized as follows:

(1) The invention is characterized by a construction based on the linear displacements of a piston within a cylindrical body (said displacements being responsive to the changes in the dimensions of the object to be measured) and their effect on the variations of the air passage area cut out of the cylindrical body.

(2) The invention is characterized in that the aforesaid air passage area or areas are formed in such a manner, that the linear displacements of the piston result in a desired, even an entirely different (i.e. non-linear) mathematical function of the flow parameters, for example of the pressure prevailing in the flow. An example of the process of the said functions is expressed in the curves shown in FIGS. 3 to 7b(B).

(3) The invention is characterized in that the functions deviating from the linearity can be of such an effect on the subsequent elements operating with certain known distortions, that the said distortions are compensated for in such a maner, that the final result, i.e. the indicating function is linear.

(4) The invention (as an alternative to item 3 above) is characterized in that the functions deviating from the linearity are of such an effect on the subsequent elements operating with certain known distortions, that the said distortions are exaggerated or damped, either from the beginning or from a certain point of the tolerance, continuously or alternately etc., so that the final result of the gauging process, i.e. the indicating function assumes a desired nature.

(5) The invention is characterized in that the passage area or areas referred to in items 1, 2, 3 and 4 above are of quadrangular shape, the two axially directed faces thereof not being linear but constituting spatial curves.

The invention is illustrated in the accompanying drawings in which:

FIG. 1 is a diagrammatic illustration of the gauging instrument,

FIG. 2 is a longitudinal sectional view of the transmitter element,

FIG. 2b is a section on the line A—A of FIG. 2,

FIG. 2c is a section on the line B—B of FIG. 2b, and

FIGS. 3, 4, 5, 6, 7a(A) and 7b(B) are functional curves of transmitter elements having differently shaped outlets.

The invention is operated in the following manner. Cleaned and dewatered air of constant working pressure is directed through an air passage 1 to an air distribution and pressure stabilizing chamber 2 and discharged therefrom through two channels 3, 4 each of which is divided into two separate lines. Channel 3 branches off into two additional lines whereof one communicates through a control valve 9 with the atmosphere and the other with the upper portion of a liquid pipe 7, said pipe being part of a U-shaped vessel. Channel 4 which extends from the distribution chamber branches off into a line for directing the air to a member 5 adapted to change under pressure, said member forming the converting functional element of the gauging instrument, and into a second line through which the air is directed through the transmitter element 10 out into the atmosphere. In this embodiment, the converting functional element 5 is a pressure box immersed in a liquid container. By pressure effect, the volume of the box increases and an excess amount of liquid is pressed out from the liquid container 6. In pipe 7, the liquid level raises to a certain value on the linear scale 8. The liquid level in pipe 7 depends substantially only on the pressure in element 5 which is actuated exclusively by the outflow through the areas of the transmitter element 10. The last-mentioned variations are determined by the variations in the dimensions of the object 11 to be measured (FIG. 1).

According to the invention, an embodiment of the transmitter element having the aforedescribed functions and properties may comprise a two-part cylindrical body 13 and 16 whereof the end surface of part 13 facing away from part 16 is an inlet 14 for the air flow and part 16 is connected with part 13 by a threaded part 15 and a sealing 28 against a shoulder 17. In the inlet 14 there is provided an exchangeable nozzle 18 with apertures 19 of a suitable diameter. On its generatrix surface part 16 is provided with one, possibly several outlet openings 20 extending through the wall and being of a special shape. By an eccentric grinding of part 16, the wall is made thinner in the proximity of the outlet openings 20, so that a sharp edge is formed on said outlet opening (FIG. 2c). The other end of part 16 has internal threads with two screws threaded therein, whereof one is an adjusting screw 22 and the other a stop screw 21. By adjusting screw 22, the stroke length of a piston 23 displaceable in part 16 is limited to a predetermined position, in which position screw 22 is secured by stop screw 21. The said piston 23 has a recess 24 in its end surface facing towards the cylinder portion 13, the mouth of said recess having sharp but wellground edges. On the other end of piston 23, a rod 25 extending through the screws 21 and 22 is rigidly mounted. A spring-like helically shaped element 26, preferably of thin wire with rectangular cross-section is provided between the nozzle 18 and the recess 24 and fastened in said recess. The said helical element and the recess proper ensure a turbulent air flow through the outflow openings 20 of cylinder part 16. Between the two parts 13 and 16 of said cylindrical body which are screwed together, there is an intermediate space 27 which due to the turning of part 16 is of annular shape. Due to the said grinding of the wall at outlet opening 20, however, the annular configuration is irregular. From the said intermediate space 27 the air escapes into the atmosphere through holes 29 arranged radially in cylindrical part 13.

According to FIGS. 2, 2b, 2c, the outlet openings 20 disposed in the end of the cylindrical part 16 and facing towards the air inlet, have a quadrangular form. Said outlet area or areas may, however, be shaped in many different ways whereby a great number of different appearances of the function curve of the transmitter element can be obtained according to FIGS. 3–7b(B).

For practical comparisons with the results obtained by using outflow openings of different shape in the transmitter element of a certain type of gauging instrument, i.e. a certain type of the converting link of the transmitter elemen, curves are drawn of the parameters shown in FIGS. 3–7b(B), said curves connecting different conditions between the reading length on the scale $h$ of the indicator and the insertion depth $t$ of the piston, which depth is equal to the restriction of the outlet opening in the lead-in direction.

It appears clearly from the aforesaid that it is possible to obtain a curve for the function of the transmitter element of substantially optional shape by giving the throughflow opening a special configuration, which configuration pays regard to the processes and elements of all functions (inclusive distortions) occurring in the functional elements of the gauging instrument.

The adaptability of the transmitter element to different types of gauging instruments or to different working pressure conditions of one and the same type of instrument is increased in that in the inlet side of the front portion 13 of the cylindrical body there is mounted an exchangeable nozzle 18. FIGS. 7a(A) and 7b(B) show how the transmitter element, by providing it with a nozzle of suitable throughflow holes 19 can be used for measuring with substantially changed function curves, i.e. such function curves which connect the displacement of the piston with indications on the indicator scale corresponding to the respective displacements. The curves shown refer to measurements made at an air pressure of 0.5 excess atmospheric pressure and by using two different outlet openings A and B. I, II and III on the respective curves refer to the hole diameters 3, 1.5 and 1.1 mm. respectively of the three nozzles. In practice, this provides an extraordinary possibility for obtaining the most suitable reading length on an indicator scale even by choosing a nozzle with suitable hole diameter at a certain tolerance.

The invention is not restricted to the embodiment described above and shown on the accompanying drawing, but may be modified in many different ways within the scope of the inventive idea.

What I claim is:

A transmitter element for pneumatic gauging instruments functioning by effecting balance between two air streams in the gauging instrument, construced as a substantially tubular body divided into two parts whereof one end constitutes the inlet for an air stream and the other end contains a piston movable into and out of said end and to restrict the air stream passing through said tubular body according to the insertion depth of said piston, at least one outlet in the wall of the tubbular body, the size and form of said outlet being adapted to be restricted in in that the piston partly covers the same, the said outlet having a section corresponding to a certain desired relation between the parameters of the air flow and the insertion depth of the piston, the said main part of the cylindrical body being ground in the proximity of the outlet ojenings, the radius of grinding exceeding essentially the external radius of the cylindrical body, so that the outlet opening has sharp edges.

References Cited
FOREIGN PATENTS 903,120  8/1962  Great Britain.

LOUIS R. PRINCE, *Primary Examiner.*

F. H. THOMSON, J. RENJILIAN, S. C. SWISHER,
*Assistant Examiners.*